(12) United States Patent
Tamura et al.

(10) Patent No.: US 6,655,666 B2
(45) Date of Patent: Dec. 2, 2003

(54) LIQUID-SEALED VIBRATION-PROOF DEVICE

(75) Inventors: Nobuyuki Tamura, Osaka (JP); Shunichi Shinobu, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 10/074,663

(22) Filed: Feb. 12, 2002

(65) Prior Publication Data

US 2003/0042089 A1 Mar. 6, 2003

(30) Foreign Application Priority Data

Sep. 6, 2001 (JP) .......................................... 2001-270834

(51) Int. Cl.[7] .............................................. F16F 13/00
(52) U.S. Cl. .................................................. 267/140.12
(58) Field of Search ........................ 267/140.11, 140.12, 267/141.2, 219; 180/300

(56) References Cited

U.S. PATENT DOCUMENTS

| 4,749,174 A | | 6/1988 | Kanda | |
|---|---|---|---|---|
| 4,840,359 A | * | 6/1989 | Hamaekers et al. | ... 267/140.12 |
| 4,923,178 A | | 5/1990 | Matsumoto et al. | |
| 4,941,649 A | | 7/1990 | Funahashi et al. | |
| 5,286,011 A | * | 2/1994 | Strand | .................... 267/140.12 |
| 5,299,788 A | | 4/1994 | Kanda | |
| 5,310,168 A | | 5/1994 | Tanahashi | |
| 5,333,847 A | | 8/1994 | Kanda | |
| 5,489,086 A | | 2/1996 | Kanda | |
| 5,558,316 A | * | 9/1996 | Lee et al. | ............... 267/140.12 |
| 5,725,202 A | * | 3/1998 | Nakamura et al. | ..... 267/140.12 |
| 5,890,704 A | * | 4/1999 | Tsutsumida | ............ 267/140.12 |
| 6,007,059 A | * | 12/1999 | Mayer | .................... 267/140.12 |
| 6,007,072 A | * | 12/1999 | Yoon | ........................ 280/5.514 |

* cited by examiner

Primary Examiner—Jack Lavinder
Assistant Examiner—Bradley King
(74) Attorney, Agent, or Firm—Jordan and Hamburg LLP (57) ABSTRACT

A liquid-sealed vibration-proof device capable of avoiding leakage of liquid upon press fitting of an outer cylinder is provided. An intermediate ring interposed between the outer cylinder and an antivibratory base is formed at its outer circumferential surface with two projecting streaks, the one on liquid chambers side being formed with cutouts. When the outer cylinder is press fitted to an attachment opening of a vehicle body, the liquid confined in a space enclosed between both projecting streaks can escape to the liquid chambers, so that liquid never leaks outside.

6 Claims, 11 Drawing Sheets

LIQUID-SEALED VIBRATION-PROOF DEVICE

BACKGROUND OF THE INVENTION

1. Field of the Invention

The present invention relates to a liquid-sealed vibration-proof device, for example, for an automobile, to be built in a support mechanism for a differential, engine, etc., or a part of a suspension mechanism in order to damp vibrations transmitted to the vehicle body.

2. Description of the Related Art

Figure 18:
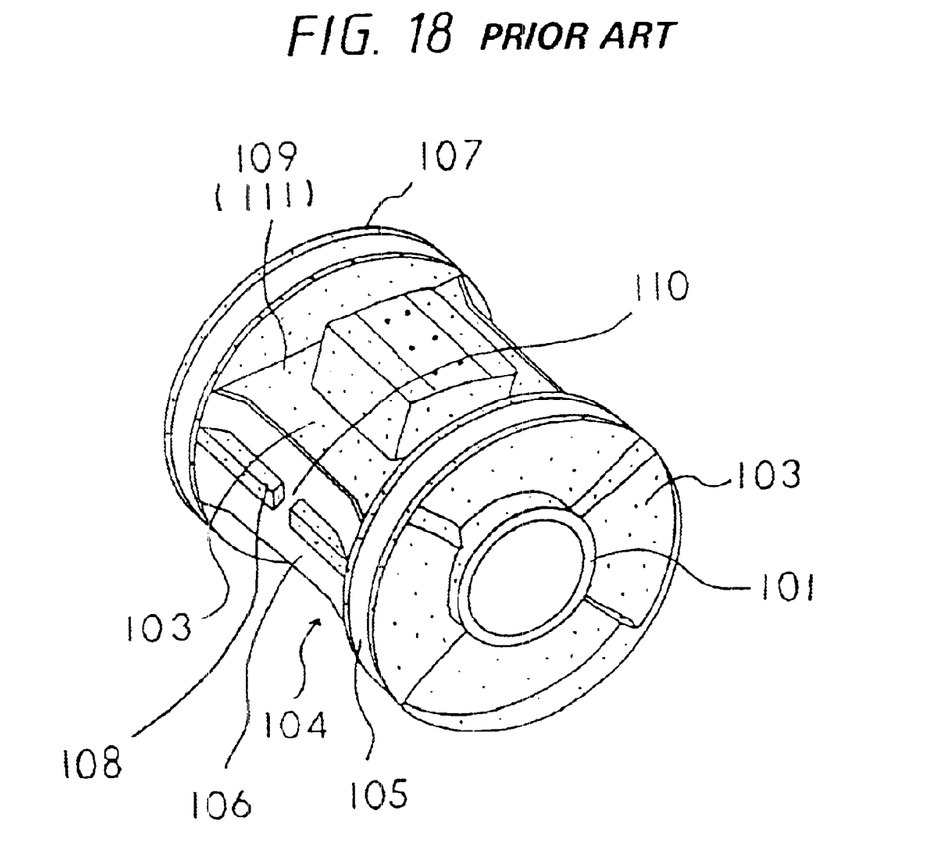
FIG. 18 is a perspective view of a prior art liquid-sealed vibration-proof device showing its state before attaching an outer cylinder.

In an automobile, a liquid-sealed vibration-proof device may be, in general, built in a support mechanism for a differential or engine or a part of a suspension mechanism with the aim of damping vibrations transmitted to the vehicle body. One example of such a liquid-sealed vibration-proof device is illustrated in FIGS. 18–21. FIG. 18 is a perspective view of the liquid-sealed vibration-proof device showing its state before an outer cylinder is fitted.

This liquid-sealed type of vibration-proof device is provided with an inner cylinder 101 made of steel, an outer cylinder 102 made of aluminum arranged outwardly to and in a spaced relation to the inner cylinder 101, and an antivibratory base 103 made of rubber-like elastomer interposed between the inner and outer cylinders 101, 102. The inner cylinder 101 is mounted on a differential case and the outer cylinder 102 is mounted on the side of the vehicle body, whereby both are connected in a vibration-proof manner.

At an outer circumferential side of the antivibratory base 103, there is secured an intermediate cylinder 104 of steel interposed between the outer cylinder 102 and the antivibratory base 103. This intermediate cylinder 104 includes intermediate rings 105 secured to the antivibratory base 103 in the vicinity of both axial ends thereof and a connecting element 106 connecting both intermediate rings 105 in its axial direction, with the intermediate rings 105 being secured to an inner peripheral surface of the outer cylinder 102, to which the antivibratory base 103 is secured.

On an outer circumferential surface of the intermediate ring 105, two pieces of projecting streaks 107 made of rubber-like elastomer are formed to seal between the outer cylinder 102 and the intermediate ring 105 and concurrently to prevent the contact between the outer cylinder 102 and the intermediate ring 105 thereby precluding corrosion due to any electric potential difference when the different metals contact each other.

Between both intermediate rings 105 at the outer circumferential side of the antivibratory base 103, there are two spaces 109 divided by a partition wall 108. By reducing the diameter of the outer cylinder 102 within a liquid tank and then fixing it to the intermediate rings 105, the spaces 109 are enclosed by the outer cylinder 102 and two liquid chambers 111 communicating with each other through an orifice 110 are thus constructed.

Figure 19:
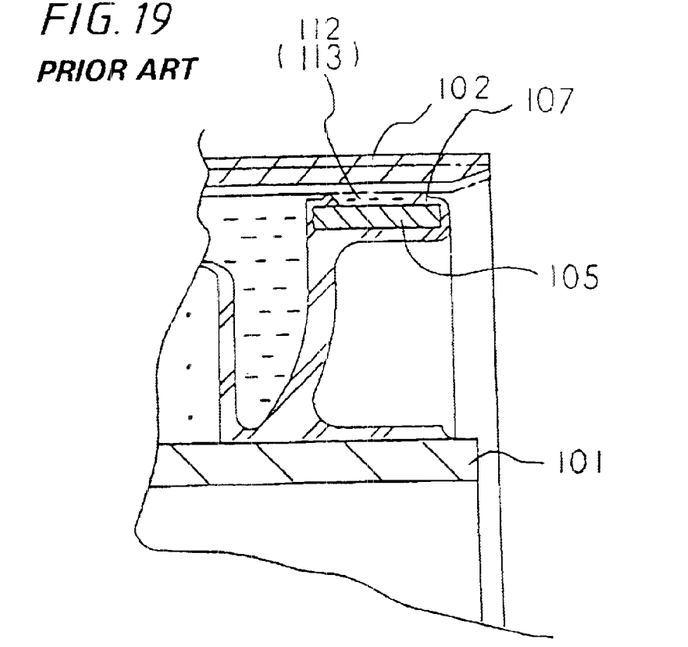
FIG. 19 is an enlarged sectional view of FIG. 18 showing the vicinity of its intermediate ring before the diameter of the outer cylinder is reduced.
Figure 20:
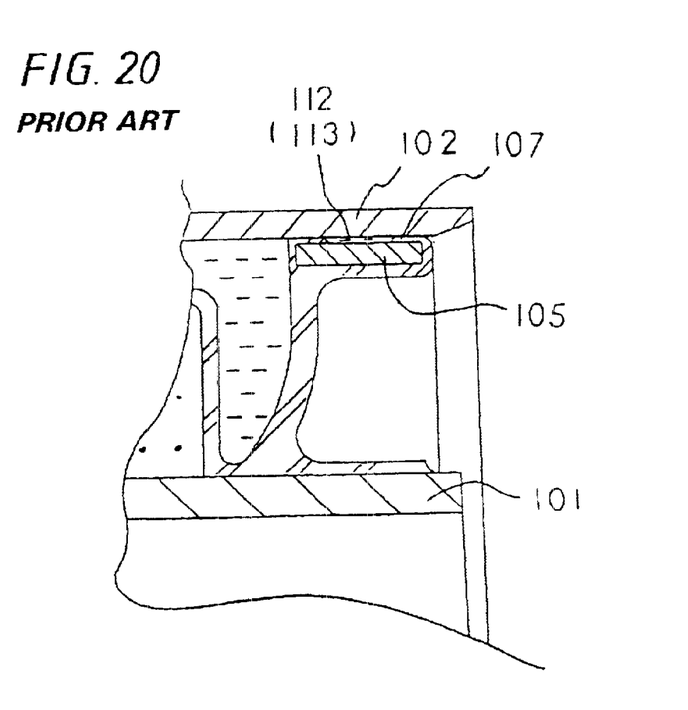
FIG. 20 is an enlarged sectional view similar to FIG. 19 after the diameter reduction of the outer cylinder.
Figure 21:
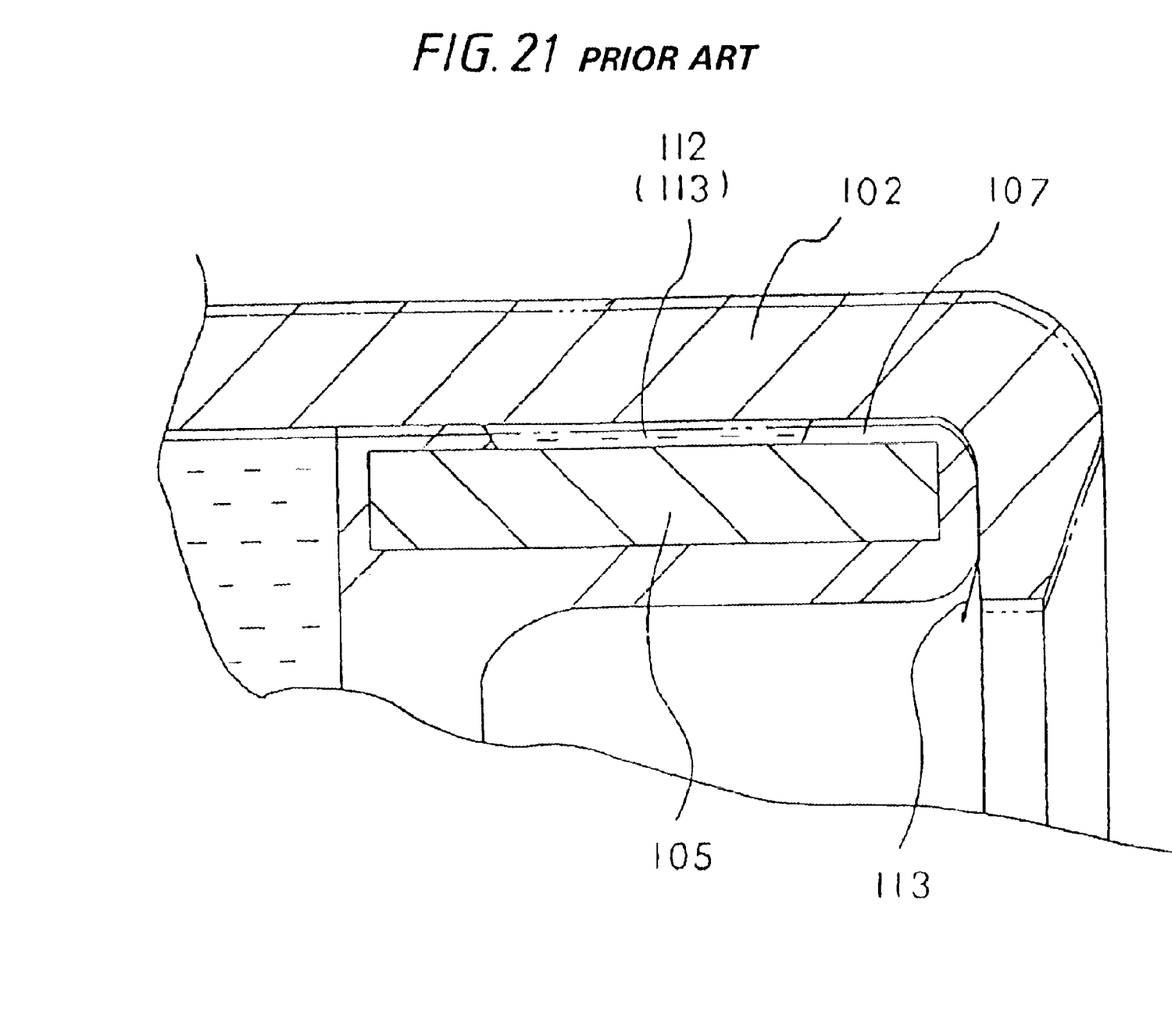
FIG. 21 is an enlarged sectional view similar to FIG. 19 showing the intermediate ring after the outer cylinder is press fitted in the opening of the vehicle body side.

FIG. 19 is an enlarged sectional view of the outer cylinder prior to its diameter reduction in the vicinity of the intermediate ring, FIG. 20 is an enlarged sectional view of the outer cylinder after the diameter reduction in the vicinity of the intermediate ring and FIG. 21 is an enlarged sectional view of the outer cylinder when press fitted in an opening on the vehicle body in the vicinity of the intermediate ring. When the outer cylinder 102 is reduced in diameter within the liquid tank and its inner peripheral surface contacts both the projecting streaks 107, a space enclosed by the outer cylinder 102, the intermediate rings 105 and the projecting streaks 107 is shut off from outside. A liquid 113 in the space 112 still remains there after the diameter of the outer cylinder 102 has been reduced.

Since the outer cylinder 102 press fitted in the opening of the body side member has a reduced diameter when the liquid-sealed vibration-proof device is installed to the vehicle body side, the volume of the space 112 in which the liquid 113 is sealed is decreased. Therefore, there is a danger of part of the liquid 113 leaking between the projecting streak 107 located on the opposite side to the liquid chamber 111 and the outer cylinder 102.

SUMMARY OF THE INVENTION

It is an object of this invention to provide a liquid-sealed vibration-proof device capable of preventing leakage of the liquid in press fitting and fixing its outer cylinder into the opening of an attachment member.

In order to achieve this object, this invention provides a liquid-sealed vibration-proof device comprising an inner cylinder, an outer cylinder spaced apart outwardly from the inner cylinder, an intermediate ring interposed between an outer circumferential side of the inner cylinder and an outer circumferential side of the outer cylinder, wherein a space formed on the outer circumferential side of the antivibratory base at an axially central side from the intermediate ring is enclosed by the outer cylinder to thereby constitute a liquid chamber. In the device, the outer cylinder and the intermediate ring are made of different metals, and two projecting streaks of rubber-like elastomer are formed on an outer circumferential surface of the intermediate ring, with one projecting streak on the liquid chamber side being formed with cutouts.

The invention is thus a liquid-sealed vibration-proof device in which the intermediate ring is interposed between the outer circumferential side of the antivibratory base and the inner circumferential side of the outer cylinder so that the outer cylinder and the antivibratory base may be fixed by diameter reduction of the outer cylinder and press fitting, etc. of the antivibratory base into the outer cylinder. Two projecting streaks of rubber-like elastomer are formed on the outer circumferential surface of the intermediate ring to prevent leakage of liquid out of the liquid chamber and contact between the outer cylinder and intermediate ring which are made of different metals. In the device in accordance with this embodiment of the invention, the projecting streak on the liquid chamber side is formed with cutouts.

In the liquid-sealed vibration-proof device in accordance with the invention, when press fitted and fixed in the opening of an attachment member, the outer cylinder is reduced in diameter whereby the liquid confined in the space enclosed by the outer cylinder, the intermediate ring and both projecting streaks is drained out of the space. By forming the cutouts at the projecting streak on the liquid chamber side, it is possible to direct the confined liquid to the liquid chamber side so that the liquid may not leak outside.

The fixing part of the outer cylinder and the antivibratory base is not always required to be interposed by the intermediate ring in the entirety thereof. Of both axially terminal sides of the liquid chamber, the intermediate ring may be interposed at the one side to fix the outer cylinder and the antivibratory base whereas the outer cylinder and the antivibratory base may be directly bonded together at the other side. In that case, for example, while compressing the antivibratory base at its direct bonding side to the outer cylinder, the outer cylinder is reduced in diameter in the liquid tank. Otherwise, the antivibratory base is formed so that the intermediate ring may be located axially outside the outer cylinder and then, in the liquid tank, the intermediate ring is axially forced and press fitted into the outer cylinder while deforming the antivibratory base, whereby the liquid chamber is sealed with the liquid.

Further, in the liquid-sealed vibration-proof device in accordance with the invention, the intermediate rings may be secured to the outer circumferential side of the antivibratory base each at a respective one of the axial sides of the liquid chamber, and both intermediate rings at both axial sides are connected through the connecting element thereby forming an intermediate cylinder interposed between the antivibratory base and the outer cylinder.

In other words, according to the invention, the intermediate rings axially connected through the connecting element are secured at both axial sides of the liquid chamber to the outer circumferential side of the antivibratory base. Consequently, it is possible to mold the antivibratory base without the outer cylinder and the molding can be simplified. It is also possible to make the distance between both axially sides of the liquid chamber definite to thereby make the volume of the liquid chamber a predetermined size.

Furthermore, in the liquid-sealed vibration-proof device in accordance with the invention the outer cylinder may be made of aluminum and the intermediate ring may be made of steel, which provides a preferred embodiment of the liquid-sealed vibration-proof device in accordance with the invention.

Thus, when the vehicle body member is made of aluminum to render the weight of the vehicle body lighter, the outer cylinder can be made of aluminum, whereby it is possible to avoid the corrosion resulting from any electric potential difference between the outer cylinder and the member on the body side. On the other hand, the intermediate ring can be made of steel thus making its dimensions smaller, whereby the size of the device is reduced.

BRIEF DESCRIPTION OF THE DRAWINGS

The working forms of the liquid-sealed vibration-proof device pertaining to this invention will be hereinafter described in more detail in conjunction with the accompanying drawings, in which.

DESCRIPTION OF PREFERRED EMBODIMENTS

Referring to the embodiment shown in FIGS. 1–14, the liquid-sealed vibration-proof device in accordance with the invention is provided with an inner cylinder 1 made of steel, an outer cylinder 2 made of aluminum arranged outwardly of the inner cylinder and spaced apart therefrom, and an antivibratory base 3 made of a rubber-like elastomer. The device is arranged with its axial direction oriented in a nearly horizontal direction so that the inner cylinder 1 is attached to a differential case and the outer cylinder 2 is attached to the vehicle body side, thus connecting both in a vibration-proof fashion.

The inner cylinder 1 is generally cup-shaped with a cylinder part 4.and a bottom part 5 and is bolt locked to the differential case by threading a nut within the cylinder part 4 to a bolt, which is provided on the differential case so as to project through a bolt hole 6 at the bottom part 5. The outer cylinder 2 is cylinder shaped and press fitted in the opening of the vehicle body side to be fixed thereto.

The antivibratory base 3 is generally ring shaped, with its upper and lower parts being hollowed out in an axially parallel relationship and mutually parallel in two planes. The inner peripheral surface of the antivibratory base 3 is secured to the outer peripheral surface of the inner cylinder 1, and on the outer peripheral side of the antivibratory base 3, there is secured an intermediate cylinder 7 made of steel interposed between the outer cylinder 2 and the antivibratory base 3.

The intermediate cylinder 7 comprises two intermediate rings 8 having a cylindrical form secured in the vicinity of two axial ends of the antivibratory base 3 and two plate-form connecting elements 9 secured to the outer peripheral surface of the antivibratory base 3 exclusive of its upper and lower surfaces. The intermediate rings 8 are secured to the inner peripheral surface of the outer cylinder 2 to connect the inner peripheral surface of the outer cylinder 2 and the antivibratory base 3 together.

Each place between upper and lower parts of the antivibratory base 3 at both axial ends thereof and the intermediate rings 8 is closed by a rubber-like elastomer membrane 10 contiguous to the antivibratory base 3, and two upper and lower spaces of the antivibratory base 3 are enclosed by the outer cylinder at its outer peripheral side thereby to form liquid chambers 11a, 11b sealed with liquid.

In a clearance 12 between the outer cylinder 2 and the connecting element 9 bringing both liquid chambers 11a, 11b into continuity, partition walls 13a, 13b made of rubber-like elastomer are arranged to shut off the liquid chambers 11a, 11b. Of these partition walls, one partition wall 13a is formed near its center with an orifice 14 through which both liquid chambers 11a, 11b communicate with each other.

When the inner and outer cylinders 1, 2 are oscillated vertically relative to one another, the liquid moves through the orifice 14 between the liquid chambers 11a, 11b to thereby damp the vibration. Upon a high frequency vibration, the rubber-like elastomer membrane 10 is adapted to deform so that the flow speed of the liquid passing through the orifice 14 does not become too large.

Within the liquid chambers 11a, 11b, a stopper 15 made of a synthetic resin secured to the inner cylinder 1 is formed in a protruding fashion. The stopper 15 is covered with a rubber-like elastomer stopper portion 16 contiguous to the antivibratory base 3 except for its central vicinity on the outer periphery side. This serves to make the friction to the liquid large to enhance the damping effect and simultaneously serves to inhibit excessive displacement upon vertical vibration by abutting on the outer cylinder 2.

At both axial ends of the outer circumferential surfaces of the intermediate rings 8, there are formed two projecting streaks 17a, 17b so that the outer cylinder 2 and the intermediate rings 8, which are made of different metals, may not contact with each other. Each of the projecting streaks 17a, 17b is formed in a manner wrapping over both axial end surfaces of the intermediate ring 8 from its inner peripheral surface contiguously to the antivibratory base 3 or the rubber-like elastomer membrane 10, and at its outer peripheral surface there is formed a crest portion 18 that serves to create a seal between the outer cylinder 2 and the intermediate ring 8.

Of both projecting streaks 17a, 17b, the projecting streak 17b on the liquid chambers 11a, 11b side is formed circumferentially equidistantly with four cutouts 19. The cutouts 19 are formed at an axial edge portion of the intermediate ring 8.

The manner in which the liquid-sealed type vibration-proof device is filled with liquid and installed on the vehicle body side will now be described. First, prior to the fitting of the outer cylinder as shown in FIGS. 1–10, the intermediate ring 8 is reduced in diameter, thereby pre-compressing the antivibratory base 3 to enhance its durability. At that time, since the intermediate ring 8 is not covered at its axial center part with rubber-like elastomer, the diameter reduction work is performed easily.

The outer cylinder 2 fitting externally on the intermediate ring 8 is reduced in diameter within a liquid tank, its both ends are crimped inwardly and secured to the intermediate ring 8, and then the liquid chambers 11a, 11b are filled with liquid. In this state, the liquid is confined within the space enclosed by the outer cylinder 2, the intermediate ring 8 and both projecting streaks 17a, 17b.

Figure 1:
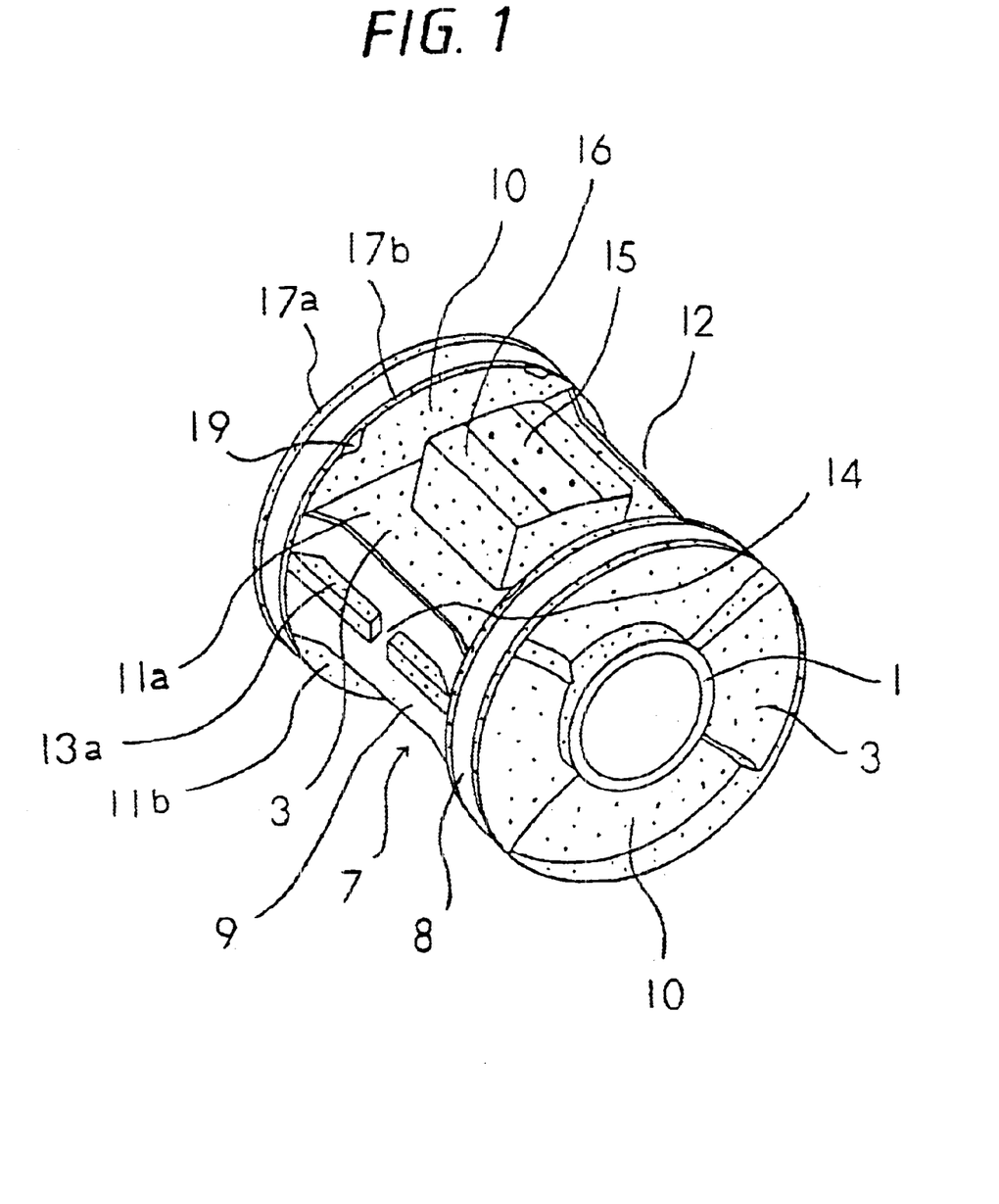
FIG. 1 is a perspective view of one embodiment of a liquid-sealed vibration-proof device in accordance with the invention showing the state before attaching of an outer cylinder.
Figure 2:
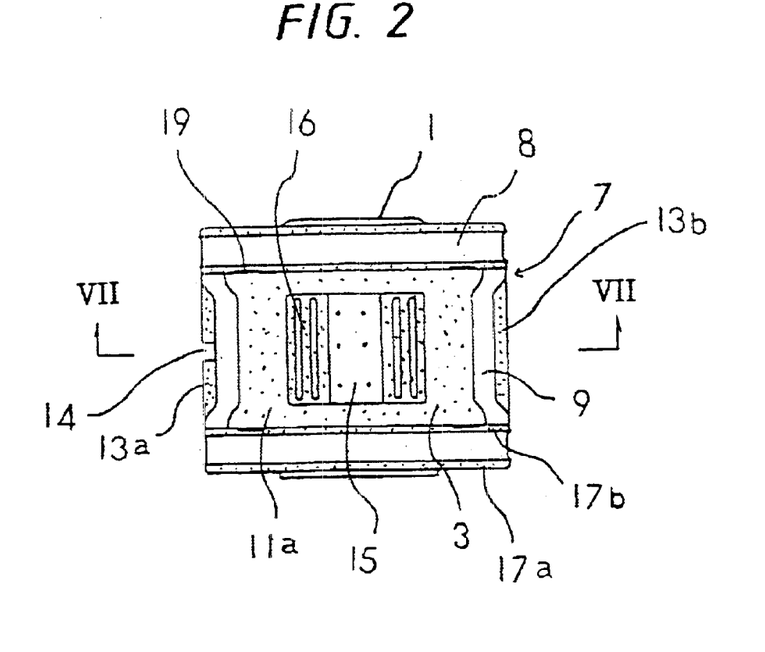
FIG. 2 is a plan view of FIG. 1.
Figure 3:
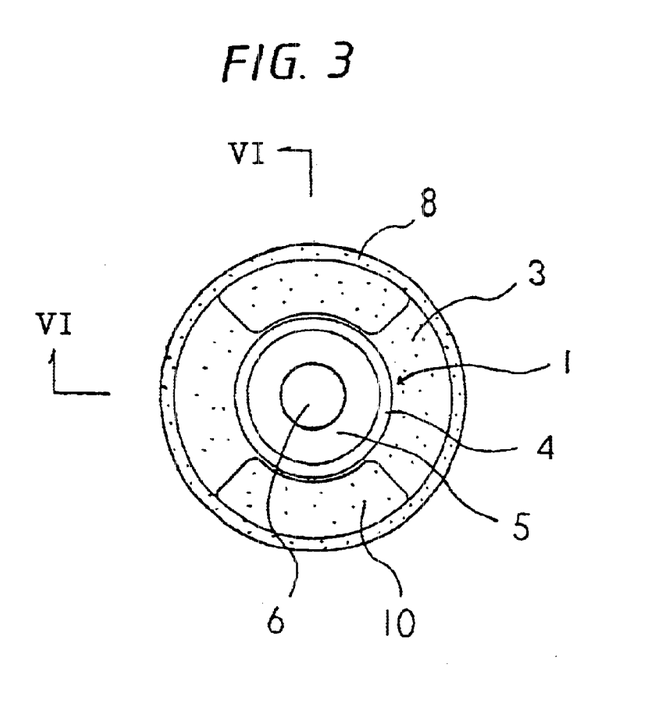
FIG. 3 is a front elevational view of FIG. 1.
Figure 4:
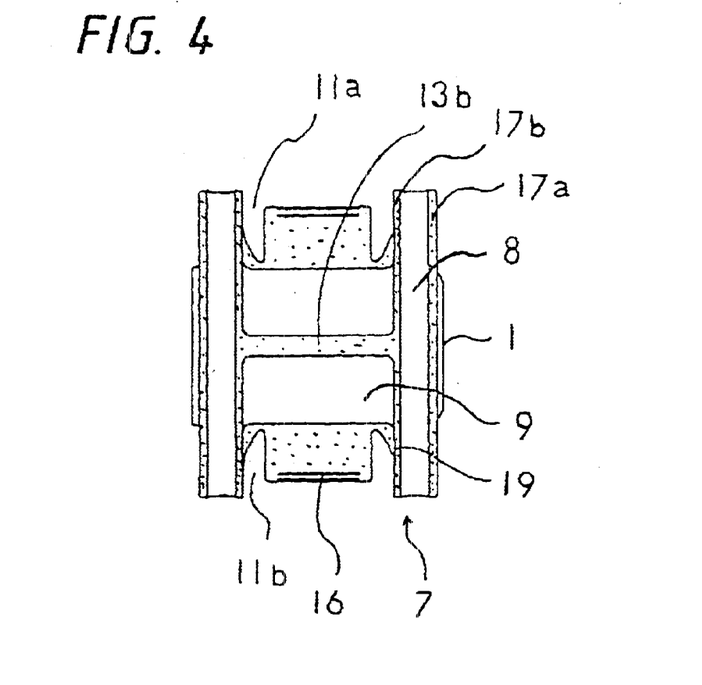
FIG. 4 is a right-hand side elevation of FIG. 1.
Figure 5:
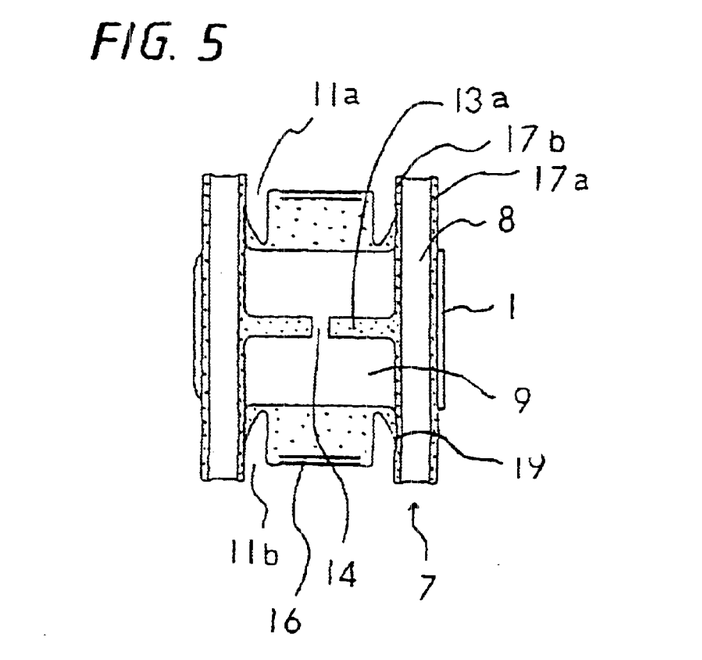
FIG. 5 is a left-hand side elevation of FIG. 1.
Figure 6:
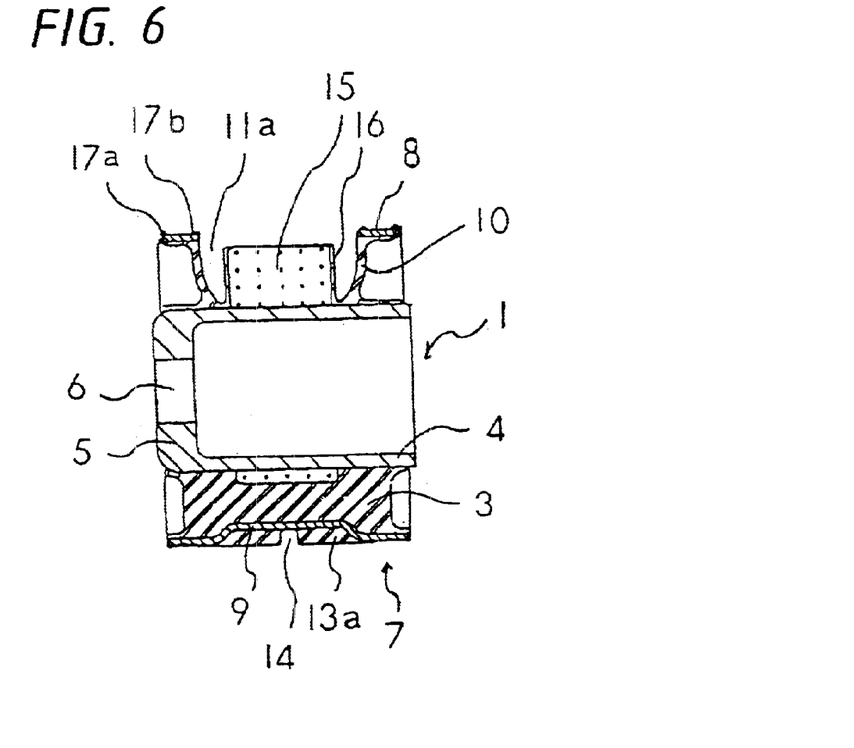
FIG. 6 is a sectional view of FIG. 3 taken along the line VI—VI in FIG. 3.
Figure 7:
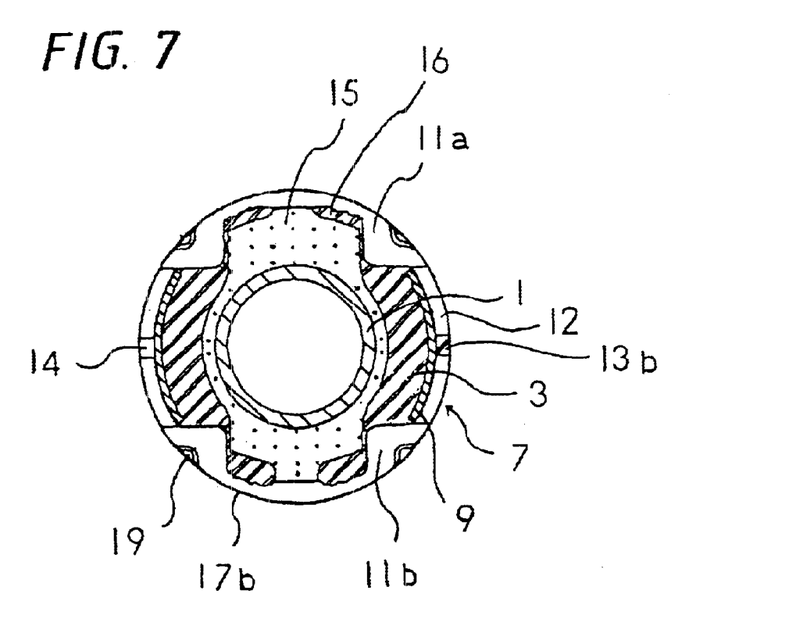
FIG. 7 is a sectional view of FIG. 2 taken along the line VII—VII in FIG. 2.
Figure 8:
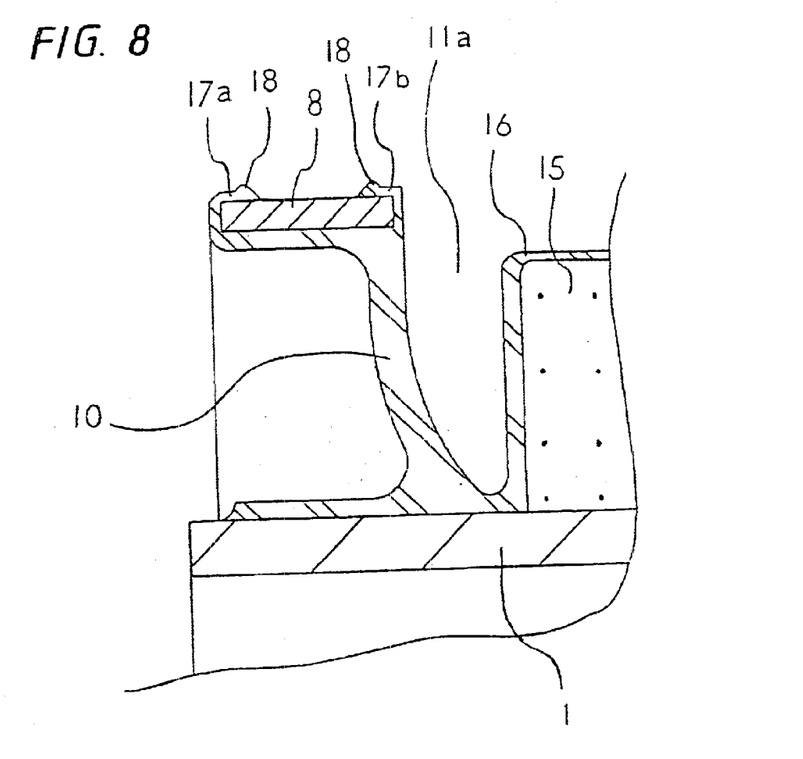
FIG. 8 is an enlarged sectional view of FIG. 6 showing the vicinity of an intermediate ring.
Figure 9:
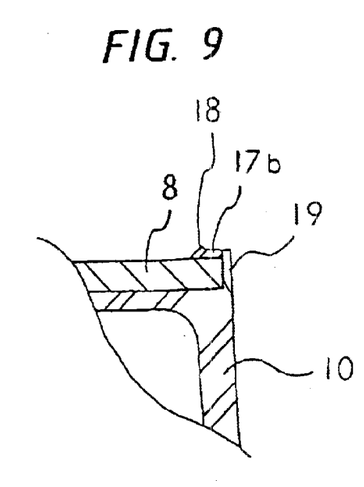
FIG. 9 is a sectional view showing a cutout at a projecting streak of the intermediate ring similar to FIG. 8.
Figure 10:
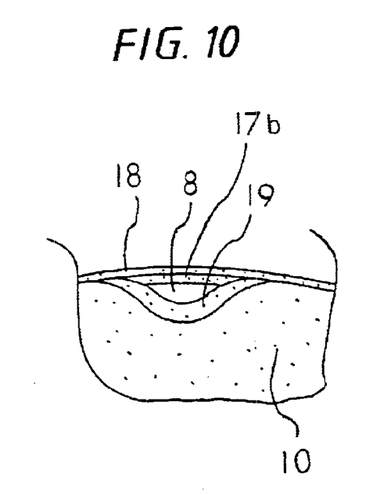
FIG. 10 is a front view of the cutout in FIG. 9.
Figure 11:
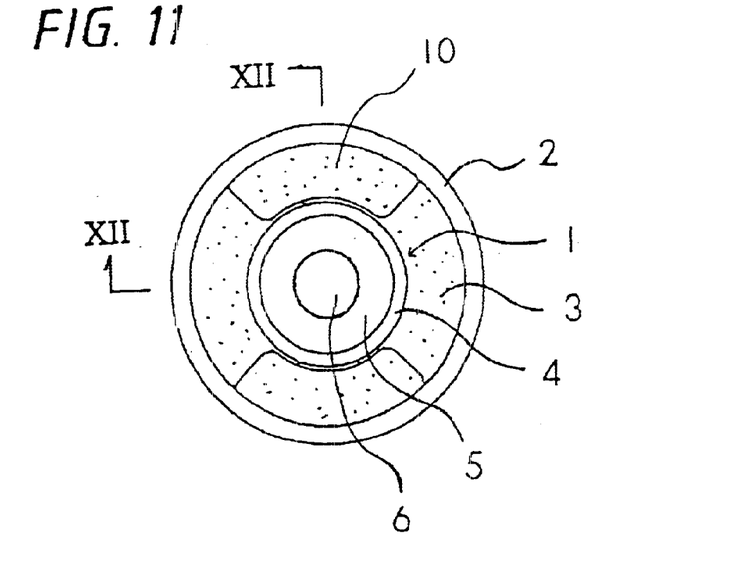
FIG. 11 is a front elevation of the device of FIG. 1 after attaching of the outer cylinder.
Figure 12:
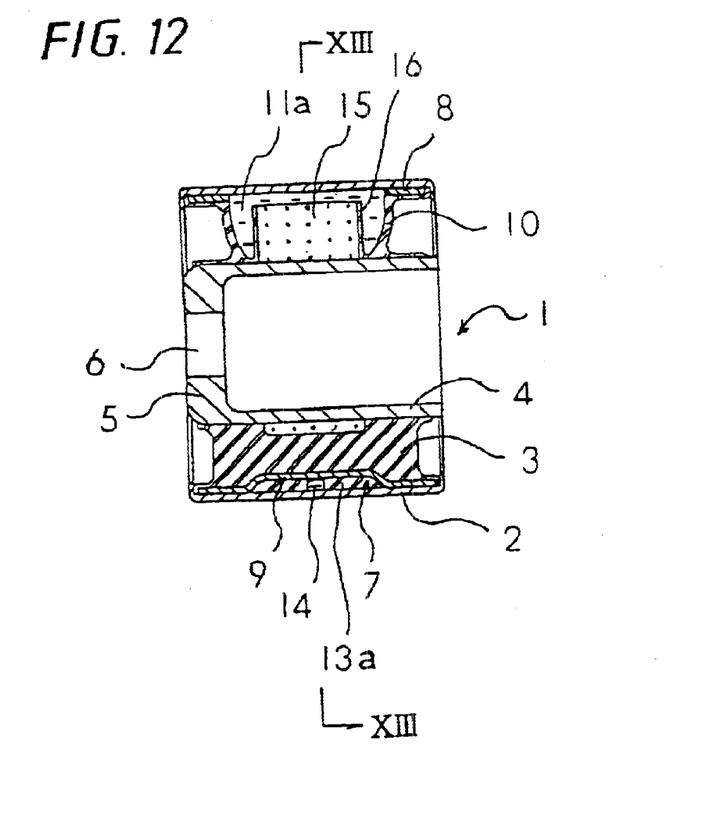
FIG. 12 is a sectional view of FIG. 11 taken along the line XII—XII in FIG. 11.
Figure 13:
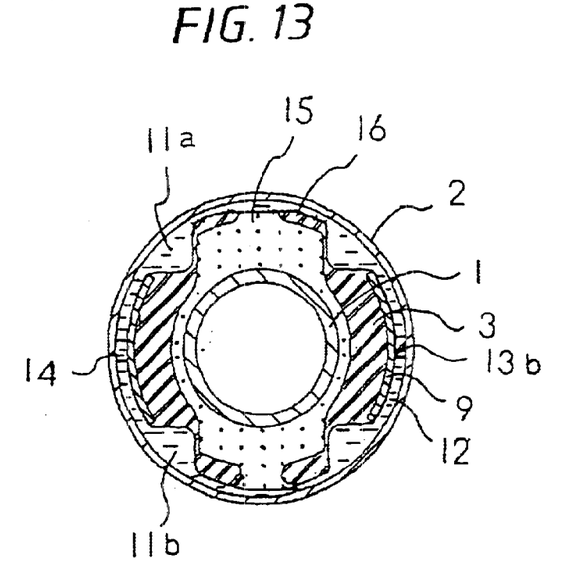
FIG. 13 is a sectional view of FIG. 12 taken along the line XIII—XIII in FIG. 12.
Figure 14:
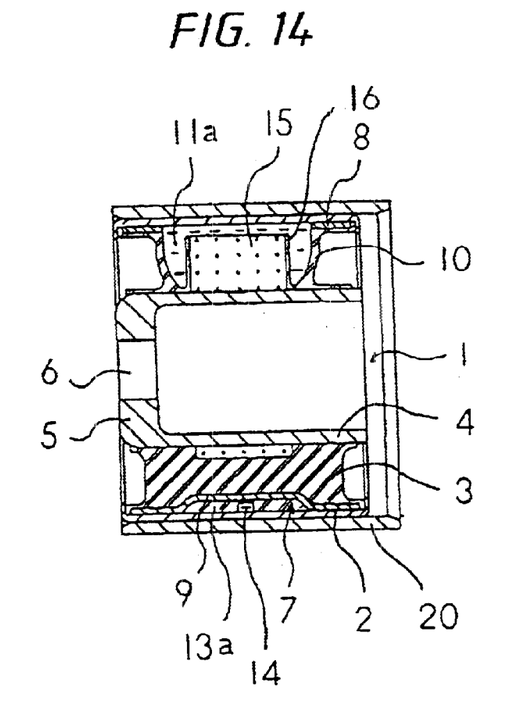
FIG. 14 is an axial sectional view of the device showing the state it is press fitted in the opening of a vehicle body side member.

The outer cylinder 2 is press fitted into a collar 20 provided at an opening margin of a frame on the vehicle body side, and the installation of the liquid-sealed vibration-proof device to the body side is thus completed. At the time of press fitting of the outer cylinder 2, the diameter of the outer cylinder 2 is reduced and the volume of the space enclosed by the outer cylinder 2, intermediate ring 8 and both projecting streaks 17a, 17b is reduced. The liquid confined within the space at that time flows out of the cutouts 19 of the projecting streak 17b into the liquid chambers 11a, 11b.

According to the construction stated above, of the projecting streaks 17a, 17b for avoiding the contact between the outer cylinder 2 and the intermediate ring 8, the projecting streak 17b on the liquid chambers 11a, 11b side is formed with the cutouts 19 so that when the outer cylinder 2 is press fitted into the vehicle body side and the hydraulic pressure between the projecting streaks 17a, 17b is increased, it is possible for the liquid to escape toward the liquid chambers 11a, 11b so that the liquid does not leak outside. Further, the cutouts 19 are formed at the axial edge portion of the intermediate ring 8 and consequently, unless the hydraulic pressure becomes extremely large as is the case with the press fitting of the outer cylinder 2, the sealing function is never impaired.

Figure 15:
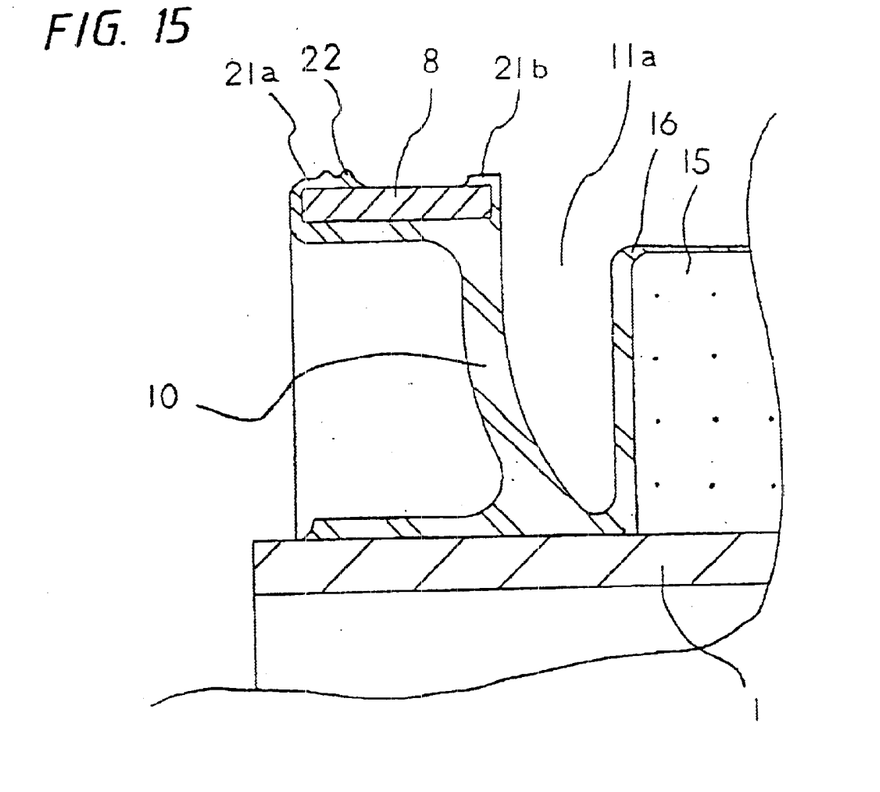
FIG. 15 is an enlarged sectional view of another embodiment of this invention showing the vicinity of the intermediate ring.
Figure 16:
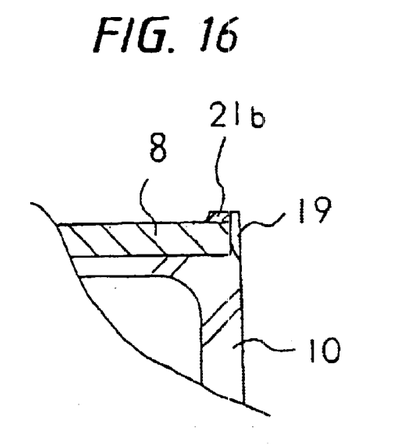
FIG. 16 is a sectional view similar to FIG. 15 showing a cutout of its projecting streak in FIG. 15.
Figure 17:
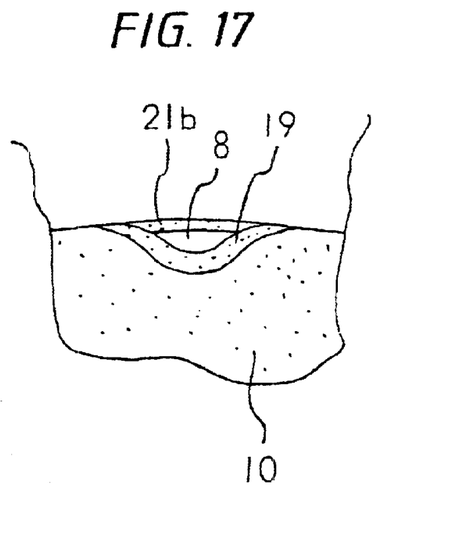
FIG. 17 is a front view showing the cutout in FIG. 16.

The invention is not limited to the embodiments described above, but it is possible to vary and modify appropriately the invention without departing from the scope of this invention. For example, a variation as shown in FIG. 15, FIG. 16 and FIG. 17 may be made. That is, the cutouts 19 may be formed at the projecting streak 21b on the liquid chambers side 11a, 11b as is the case with the embodiment described above with reference to FIGS. 1–14, and two crests 22 may be formed on the opposite projecting streak 21a to the liquid chambers 11a, 11b without forming any crest on the projecting streak 21b. In this manner, the axial width of the projecting streak 21b is shorter than that of the projecting streak 21a, with the result that the sealing function of the projecting streak 21a is higher than that of the projecting streak 21b.

By enhancing the sealing function of the projecting streak 21a opposite to the liquid chambers 11a, 11b more than that of the projecting streak 21b on the liquid chambers 11a, 11b, it is possible for the liquid confined between the projecting streaks 21a, 21b to escape toward the liquid chambers 11a, 11b to thereby avoid the liquid leakage when press fitting the outer cylinder 2 into the vehicle body side.

As will be apparent from the description above, according to this invention, of the two projecting streaks formed on the outer circumferential surface of the intermediate ring, the projecting streak on the liquid chamber side is formed with cutouts and hence upon press fitting of the outer cylinder into the vehicle body side, the liquid confined between the projecting streaks is directed to the liquid chambers, so that leakage outside is prevented.

As a result, in case where the outer cylinder and the intermediate ring are made of different metals, it is possible to preclude the contact between both without leaking liquid so that corrosion due to any electric potential difference can be prevented. Therefore, it is possible to make the weight of a vehicle body lighter by making both the outer cylinder and the body side frame of aluminum and to reduce the size of the liquid-sealed vibration-proof device by making the intermediate ring of steel.

What is claimed is:

1. A liquid-sealed vibration-proof device comprising:
an inner cylinder,
an outer cylinder arranged outwardly of the inner cylinder and spaced from the inner cylinder,
an antivibratory base made of an elastomer and interposed between the inner and outer cylinders,
a first intermediate ring interposed between an outer circumferential side of the antivibratory base and an inner circumferential side of the outer cylinder, a space being formed on the outer circumferential side of the antivibratory base at an axially central side from the first intermediate ring and being enclosed by the outer cylinder to thereby constitute liquid chambers, the first intermediate ring having an outer circumferential surface, the outer cylinder and the first intermediate ring being made of different metals, and two projecting streaks arranged at least partially on the outer circumferential surface of the first intermediate ring, one of the projecting streaks being arranged on an axial side of the first intermediate ring facing the liquid chamber and including cutouts formed at an axial edge portion of the first intermediate ring, wherein the projecting streaks are continuous around the outer circumferential surface of the first intermediate ring to thereby prevent contact between the outer cylinder and the first intermediate ring.

2. A liquid-sealed vibration-proof device comprising:

an inner cylinder, an outer cylinder arranged outwardly of the inner cylinder and spaced from the inner cylinder, an antivibratory base made of an elastomer and interposed between the inner and outer cylinders, a first intermediate ring interposed between an outer circumferential side of the antivibratory base and an inner circumferential side of the outer cylinder, a space being formed on the outer circumferential side of the antivibratory base at an axially central side from the first intermediate ring and being enclosed by the outer cylinder to thereby constitute liquid chambers, the first intermediate ring having an outer circumferential surface, the outer cylinder and the first intermediate ring being made of different metals, and two projecting streaks arranged at least partially on the outer circumferential surface of the first intermediate ring, one of the projecting streaks being arranged on an axial side of the first intermediate ring facing the liquid chamber and including cutouts formed at an axial edge portion of the first intermediate ring, wherein the cutouts are formed circumferentially equidistant at the axial edge portion of the first intermediate ring.

3. A liquid-sealed vibration-proof device comprising:

an inner cylinder, an outer cylinder arranged outwardly of the inner cylinder and spaced from the inner cylinder, an antivibratory base made of an elastomer and interposed between the inner and outer cylinders, a first intermediate ring interposed between an outer circumferential side of the antivibratory base and an inner circumferential side of the outer cylinder, a space being formed on the outer circumferential side of the antivibratory base at an axially central side from the first intermediate ring and being enclosed by the outer cylinder to thereby constitute liquid chambers, the first intermediate ring having an outer circumferential surface, the outer cylinder and the first intermediate ring being made of different metals, and two projecting streaks arranged at least partially on the outer circumferential surface of the first intermediate ring, one of the projecting streaks being arranged on an axial side of the first intermediate ring facing the liquid chamber and including cutouts formed at an axial edge portion of the first intermediate ring, wherein the projecting streak arranged on the side of the first intermediate ring facing the liquid chambers includes four cutouts formed circumferentially equidistant at the axial edge portion of the first intermediate ring.

4. A liquid-sealed vibration-proof device comprising:

an inner cylinder, an outer cylinder arranged outwardly of the inner cylinder and spaced from the inner cylinder, an antivibratory base made of an elastomer and interposed between the inner and outer cylinders, a first intermediate ring interposed between an outer circumferential side of the antivibratory base and an inner circumferential side of the outer cylinder, a space being formed on the outer circumferential side of the antivibratory base at an axially central side from the first intermediate ring and being enclosed by the outer cylinder to thereby constitute liquid chambers, the first intermediate ring having an outer circumferential surface, the outer cylinder and the first intermediate ring being made of different metals, and two projecting streaks arranged at least partially on the outer circumferential surface of the first intermediate ring, one of the projecting streaks being arranged on an axial side of the first intermediate ring facing the liquid chamber and including cutouts formed at an axial edge portion of the first intermediate ring, wherein the cutouts are formed at the axial edge portion of the first intermediate ring to expose a portion of an axial edge of the first intermediate ring to the liquid chambers and enable liquid flow along the first intermediate ring and through the cutouts between a space defined between the projecting streaks and the liquid chambers.

5. A liquid-sealed vibration-proof device comprising:

an inner cylinder, an outer cylinder arranged outwardly of the inner cylinder and spaced from the inner cylinder, an antivibratory base made of an elastomer and interposed between the inner and outer cylinders, a first intermediate ring interposed between an outer circumferential side of the antivibratory base and an inner circumferential side of the outer cylinder, a space being formed on the outer circumferential side of the antivibratory base at an axially central side from the first intermediate ring and being enclosed by the outer cylinder to thereby constitute liquid chambers, the first intermediate ring having an outer circumferential surface, the outer cylinder and the first intermediate ring being made of different metals, and two projecting streaks arranged at least partially on the outer circumferential surface of the first intermediate ring, one of the projecting streaks being arranged on an axial side of the first intermediate ring facing the liquid chamber and including cutouts formed at an axial edge portion of the first intermediate ring, wherein the cutouts are arranged entirely radially inward of the first intermediate ring.

6. A liquid-sealed vibration-proof device comprising:

an inner cylinder, an outer cylinder arranged outwardly of the inner cylinder and spaced from the inner cylinder, an antivibratory base made of an elastomer and interposed between the inner and outer cylinders, a first intermediate ring interposed between an outer circumferential side of the antivibratory base and an inner circumferential side of the outer cylinder, a space being formed on the outer circumferential side of the antivibratory base at an axially central side from the first intermediate ring and being enclosed by the outer cylinder to thereby constitute liquid chambers, the first intermediate ring having an outer circumferential surface, the outer cylinder and the first intermediate ring being made of different metals, and two projecting streaks arranged at least partially on the outer circumferential surface of the first intermediate ring, one of the projecting streaks being arranged on an axial side of the first intermediate ring facing the liquid chamber and including cutouts formed at an axial edge portion of the first intermediate ring, wherein the projecting streaks are annular and extend entirely around the first intermediate ring.

* * * * *